United States Patent [19]
Laurizio

[11] 3,891,118
[45] June 24, 1975

[54] PLASTIC BONDED CLOSURE

[75] Inventor: Jeremiah J. Laurizio, New Providence, N.J.

[73] Assignee: American Flange & Manufacturing Co., Inc., New York, N.Y.

[22] Filed: July 2, 1973

[21] Appl. No.: 375,451

[52] U.S. Cl. ............................ 220/288; 220/85 R
[51] Int. Cl. ......................................... B65d 41/04
[58] Field of Search ........ 220/39 R, 85 R, 39 B, 83; 264/DIG. 41, 68, 248; 285/201, 202, 203, 204

[56] References Cited
UNITED STATES PATENTS

| | | | |
|---|---|---|---|
| 2,147,325 | 2/1939 | Wackman | 220/39 R X |
| 2,151,702 | 3/1939 | Ilg | 220/39 R X |
| 2,160,598 | 5/1939 | Melrath | 220/39 B |
| 3,080,182 | 3/1963 | Waldo | 220/39 R X |
| 3,353,849 | 11/1967 | Laurizio | 264/248 X |
| 3,424,481 | 1/1969 | Fulghum | 220/39 R X |

Primary Examiner—George E. Lowrance
Assistant Examiner—Steven M. Pollard

[57] ABSTRACT

A closure flange molded of synthetic plastic material has an upstanding cylindrical neck with an internally threaded portion for reception of a closure plug. The lower portion of the cylindrical neck is surrounded by an annular collar constructed to facilitate bonding of the flange about a plastic container wall opening while the uppermost end of the cylindrical neck is formed to receive an overlying cap seal.

2 Claims, 5 Drawing Figures

PATENTED JUN 24 1975
3,891,118
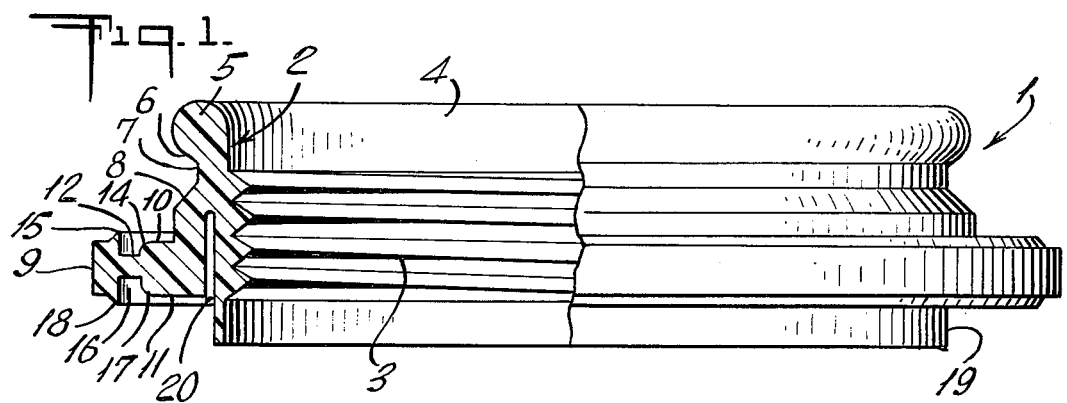
Fig. 1.
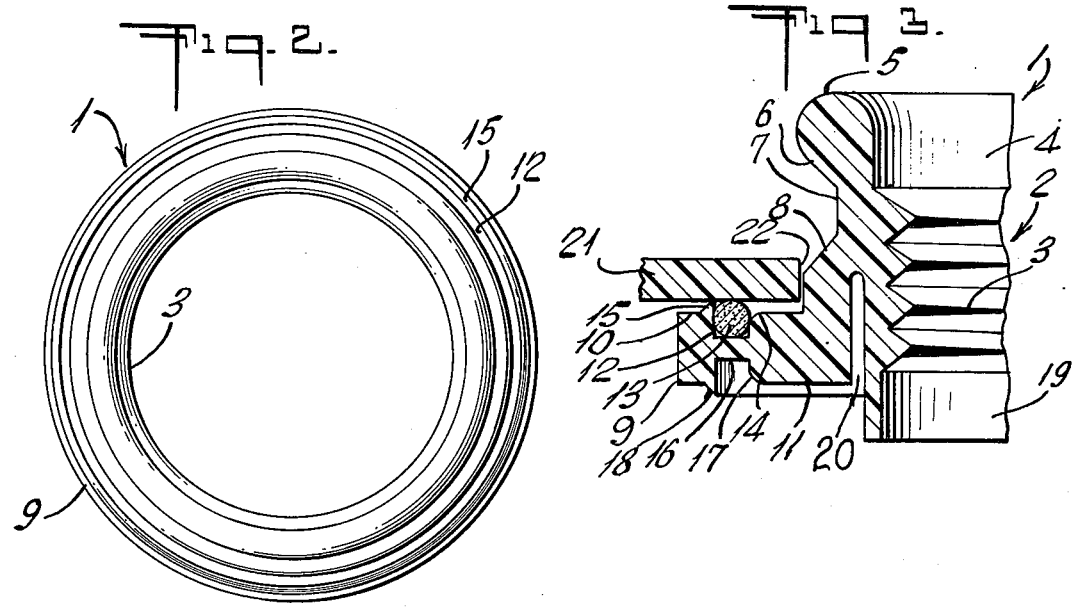
Fig. 2.
Fig. 3.
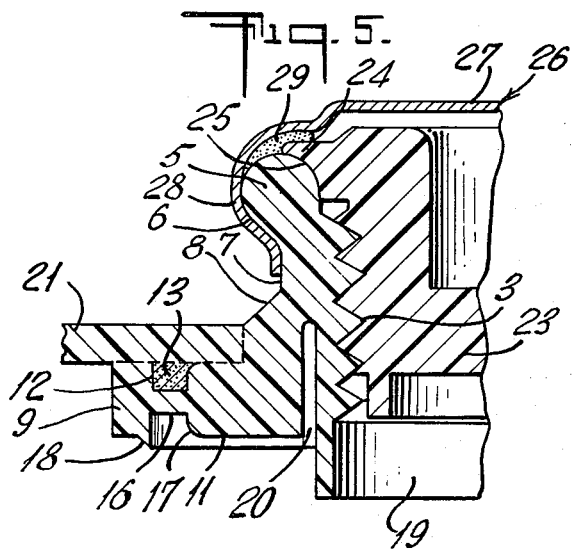
Fig. 5.
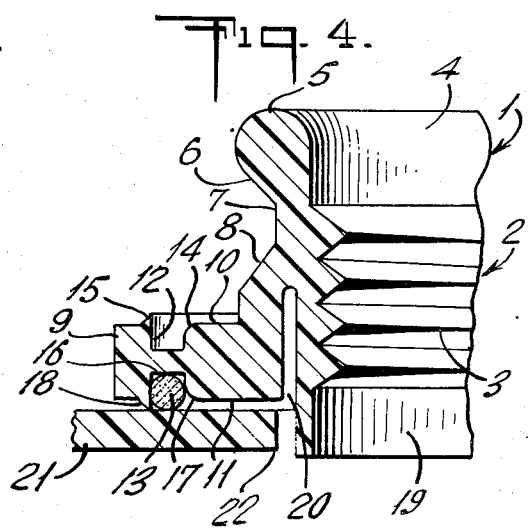
Fig. 4.

PLASTIC BONDED CLOSURE

BACKGROUND OF THE INVENTION

As the underlying economic structure continues to improve upon which the manufacture of plastic pails and drums is based, more and more attention is being brought to focus on the development of suitable closures for such containers. Although numerous available closure constructions have been brought forward to meet this need, certain serious deficiencies still remain in perfecting such arrangements. For example, closure assemblies which are mechanically crimped onto a container must rely for their sealing efficiency upon the quality of the upstanding container wall opening neck. Frequently encountered surface interruptions, depending upon the molding process, introduce leakage path possibilities. Threaded closure constructions of the type which are pressed into a plastic container wall opening with an interference fit appear to be marginal in sealing performance, particularly in the larger sizes where closure rigidity and torque resistance became major factors. Another approach which has been tried with limited success is the molding of a standard pipe thread directly within an integrally formed opening neck. However, this arrangement as well, requires a degree of accuracy in the thread formation frequently lacking in the molding of plastic pails and drums such as used in the industrial container field.

In addition to the above arrangements, there are in existence a number of plastic bonding techniques which advantageously lend themselves to the fabrication of plastic containers. These techniques include, but are in no way limited to, induction welding, ultrasonic welding and spin welding, all of which can be employed to form a substantially homogeneous bond at the interface between a closure flange and a surrounding container wall section. To date, however, only limited usage has been made of these bonding techniques in the industrial plastic container field and it is to this particular closure construction concept that the instant invention is directed.

The plastic bonded flange herein disclosed is believed to advantageously overcome all of the prior art deficiencies found to be so prevalent in the mechanically secured container closure constructions while at the same time preserving the beneficial features of conventional closures such as the ability to receive an industry standard screw threaded plug and overlying tamperproof cap seal. This has been accomplished by molding a cylindrical, internally threaded closure flange of synthetic plastic material having a circumferential collar specially suited for thermoplastic bonding to a flat container wall section surrounding an opening thereof. In addition, the uppermost end of the flange has a circumferentially enlarged bead to enable the crimping of a cap seal over the dispensing opening.

It is accordingly a principal object of the invention to provide a new plastic closure flange adapted for thermoplastic bonding to a plastic container wall opening. Another object is to provide a plastic closure flange integrally bonded to a plastic container wall section and adapted for reception for a screw threaded plug and a tamperproof cap seal.

Other and more detailed objects will, in part, be obvious and in part pointed out as the description of the invention taken in conjunction with the accompanying drawing proceeds.

In that drawing:

FIG. 1 is a part elevational, part sectional view of the closure flange of the invention;

FIG. 2 is a top plan view thereof;

FIG. 3 is an enlarged fragmentary sectional view showing the flange in position for bonding the interior of a container wall.

FIG. 4 is a view similar to FIG. 3 and showing the flange in position for bonding to the exterior surface of a container wall, and FIG. 5 is a sectional view of the assembly of FIG. 4 after the bonding process is completed.

Looking at FIGS. 1 and 2, the closure flange 1 molded of synthetic plastic material consists of an upstanding cylindrical neck 2 having an interiorly threaded portion 3. The upper end of the flange neck has a short unthreaded portion 4 and terminates in a circumferentially enlarged bead 5. The exterior surface of the flange neck 3 commences with an undercut surface 6 beneath the bead 5 joined to a short section 7 of reduced diameter. Below the section 7 the flange neck is again circumferentially thickened into an upper pilot portion as indicated at 8 and surrounded by a laterally extending annular collar 9 having an upwardly facing surface 10 and a downwardly facing surface 11.

As also seen in FIGS. 3 and 4, the upper collar surface 10 is provided with an upwardly facing annular groove 12 spaced radially outwardly from the neck 2. An electrical conductor 13, formed of metal particles embedded within a thermoplastic material, is nested within the groove 12. For a purpose to be further described hereinafter, the radially inner wall of the groove 12 is gradually radiused at 14 at its juncture with the collar top surface 10. Also, the radially outer wall of the groove 12 extends above the surface 10 so as to more securely retain the conductor 13 within the groove 12 and terminates in a sharp annular protrusion 15. The under surface of the collar 9 is similarly provided with a downwardly opening groove 16 with the inner wall of the groove gradually radiused at 17 at its juncture with the collar bottom surface 11 and the outer wall of the groove extending below the surface 11 in a sharp annular protrusion 18. The lower end of the flange neck 2 terminates in an unthreaded, lower pilot portion 19 extending below the collar lower surface 11. An annular void 20 is located within the flange neck and extends from the collar lower surface 11 to a point well above the upper surface 10.

In securing the flange 1 to a container wall section 21 provided with a flat opening 22, it can be seen from a comparison of FIGS. 3 and 4, that the flange can be applied with equal facility to either the interior or the exterior surface of the container wall. For example, large one piece blow molded drums require that the closure flange be applied to the exterior surface while injection molded, two piece pails may require that the flange neck extend up through the opening in the pail head in order to achieve the necessary low profile for stackability. FIG. 3 illustrates the relationship of the parts prior to bonding when the flange is to be secured to the undersurface of a pail head. Here it can be seen that the enlarged neck portion 8 acts as a pilot for centering the flange neck 2 within the container wall opening 22 so that the undersurface of the container wall 21 rests upon the collar protrusion 15 and also bears against upper surface of the conductor 13. Upon the application of downward pressure and introduction of the assembly within a magnetic field, the flange 1 is ready to be induction welded to the container wall 21. As the induction welding process commences the plastic bonding material in the conducting element 13 starts to melt together with the walls of the groove 12. The protrusion 15 also starts to melt, causing the upper surface 10 of the collar 9 to move toward the undersurface of the container wall 21. As this movement takes place, however, the protrusion 15 acts as a dam against the outward flow of the plastic bonding material while the radiused juncture 14 encourages the radially inward flow of bonding material. As a result, as seen in FIG. 5, the collar and the container wall become integrally connected by a homogeneous bonding together of the adjacent flange and container wall surfaces. As an added precaution during the bonding cycle, the annular void 20 prevents the transmission of a possible heat concentration directly to the threaded portion 3 which might cause some undesirable warpage in this area. Looking at FIG. 4 it is seen that the above described bonding process can alternatively be performed in joining the collar under surface 11 to the upper surface of the container wall 21. In this instance the flange pilot portion 19 assures proper and easy centering of the collar 9 about the container wall opening 22. As in the arrangement of FIG. 3, the protrusion 18 together with the radiused juncture 17 cause a slight radially inward flowing of the bonding material in the conductor element 13. The result is once again a homogeneous thermoplastic bonding of the flange to the exterior of the container wall as would be required for blow molded containers.

Looking further at FIG. 5, the closure assembly is completed with the threaded engagement of a closure plug 23 within the flange neck 2 having circumferentially enlarged head 24 with a self-gasketing portion 25 in sealing engagement with the flange bead 5. A tamperproof cap seal 26 is then applied over the flange and plug comprising a top panel 27, a depending skirt 28 and an annular sealing gasket 29. The seal skirt 28 is tightly crimped against the undercut surface 6 on the neck bead so as to compress the seal gasket 29 tightly against the bead 5 and the plug head 24.

From the foregoing it is seen that a complete sealed closure assembly is effectively integrally connected to a plastic container wall. While the description of the invention as been directed to the use of the induction bonding process, it should be noted that other thermoplastic bonding processes such as ultrasonic bonding and spin welding could also be employed with the invention construction.

Having described my invention, what I claim is as follows:

1. A closure flange molded of synthetic plastic material adapted for thermoplastic bonding to a plastic container wall opening, comprising an upstanding cylindrical neck, a screw thread formed on the interior of said neck, pilot means formed on said neck for centering said flange within a container wall opening, a laterally extending annular collar surrounding said neck having upper and lower surfaces, an axially opening annular groove formed in one of said surfaces spaced radially outwardly of said neck, an electrical conductor element retained within said groove to facilitate thermoplastic bonding of said collar to a plastic container wall section surrounding said opening, an annular protrusion positioned radially outwardly of said conductor extending axially away from said groove and a circumferentially enlarged bead at the uppermost end of said cylindrical neck displaced completely radially inwardly of said groove and adapted to receive an overlying tamperproof cap seal.

2. A closure flange, as in claim 1, wherein said groove is formed on both said upper and lower collar surfaces to facilitate thermoplastic bonding of said collar to either the interior or exterior surface of a plastic container wall.

* * * * *